US012738656B2

(12) United States Patent
Eshrah et al.

(10) Patent No.: US 12,738,656 B2
(45) Date of Patent: Sep. 15, 2026

(54) APPARATUS AND METHODS FOR STAIRCASE ANTENNAS

(71) Applicant: Analog Devices International Unlimited Company, Limerick (IE)

(72) Inventors: Islam A. Eshrah, Giza (EG); Ahmed M. Refaey, Giza (EG)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 450 days.

(21) Appl. No.: 18/329,866

(22) Filed: Jun. 6, 2023

(65) Prior Publication Data

US 2024/0170847 A1 May 23, 2024

Related U.S. Application Data

(60) Provisional application No. 63/384,484, filed on Nov. 21, 2022.

(51) Int. Cl.
*H01Q 9/04* (2006.01)
*H01Q 21/06* (2006.01)
*H01Q 25/00* (2006.01)

(52) U.S. Cl.
CPC ......... *H01Q 9/0471* (2013.01); *H01Q 9/0414* (2013.01); *H01Q 9/045* (2013.01); *H01Q 21/065* (2013.01); *H01Q 25/001* (2013.01)

(58) Field of Classification Search
CPC .... H01Q 9/045; H01Q 9/0414; H01Q 9/0471; H01Q 21/001; H01Q 21/065
See application file for complete search history.

(56) References Cited

U.S. PATENT DOCUMENTS

| | | | | |
|---|---|---|---|---|
| 5,801,660 | A | 9/1998 | Ohtsuka et al. | |
| 7,388,556 | B2 | 6/2008 | Zimmerman | |
| 9,153,863 | B2 * | 10/2015 | Nair | H01Q 1/2283 |
| 2004/0090369 | A1 * | 5/2004 | McCarrick | H01Q 9/0414 343/700 MS |
| 2008/0204324 | A1 | 8/2008 | Okamura et al. | |
| 2009/0273522 | A1 * | 11/2009 | Tatarnikov | H01Q 9/0442 343/700 MS |

(Continued)

FOREIGN PATENT DOCUMENTS

| | | | | |
|---|---|---|---|---|
| EP | 1 014 486 A1 | | 6/2000 | |
| WO | WO-2021166443 A1 | * | 8/2021 | H01Q 9/0414 |

OTHER PUBLICATIONS

Antenna Theory: A Review, Balanis, Proc. IEEE vol. 80 No. 1 Jan. 1992 (Year: 1992).*

(Continued)

*Primary Examiner* — Amal Patel
(74) *Attorney, Agent, or Firm* — Knobbe, Martens, Olson & Bear, LLP

(57) ABSTRACT

Apparatus and methods for staircase antennas are disclosed. In certain embodiments, patch antenna elements are formed on two or more conductive layers of a circuit board with the patch antenna elements interconnected by vias to form a staircase-shaped antenna. The staircase antenna communicates using a tilted beam during normal operation (for instance, with no phase shift). Thus, the staircase antenna radiates at an angle, for instance, a diagonal relative to a planar surface of the circuit board.

20 Claims, 14 Drawing Sheets

(56) References Cited

U.S. PATENT DOCUMENTS

| | | | | |
|---|---|---|---|---|
| 2021/0313695 | A1 | 10/2021 | Zhao et al. | |
| 2022/0158358 | A1* | 5/2022 | Tai | H01Q 21/065 |
| 2022/0384945 | A1* | 12/2022 | Sakaida | H01Q 9/0414 |
| 2022/0407233 | A1* | 12/2022 | Woo | H04B 7/0617 |

OTHER PUBLICATIONS

Extended European Search Report for Application No. 23210721.9 dated Apr. 8, 2024 in 13 pages.

Avser et al. "Interwoven feeding networks with aperture sinc-distribution for limited-scan phased arrays and reduced number of phase shifters." IEEE Transactions on Antennas and Propagation, vol. 66, No. 5 dated May 2018, in 13 pages.

Chacko et al. "Tilted-beam superstrate antenna with low-profile and high-gain." 2016 IEEE International Symposium on Antennas and Propagation (APSURSI). IEEE, 2016, in 2 pages.

Mantash et al. "Millimetre-wave antenna with tilted beam for future base station applications." IET Microwaves, Antennas & Propagation 13.2 (2019), in 9 pages.

Mehmood et al., "Dielectric Resonator Antenna With Tilted Beam" IEEE Antennas and Wireless Propagation Letters, vol. 16, 2017 in 4 pages.

Pal et al., "Doughnut and Tilted Beam Generation Using a Single Printed Star Antenna" IEEE Transactions on Antennas and Propagation, vol. 57, No. 10 dated Oct. 2009, in 6 pages.

* cited by examiner

@ 40GHz

@ 46GHz

APPARATUS AND METHODS FOR STAIRCASE ANTENNAS

CROSS-REFERENCE TO RELATED APPLICATIONS

The present application claims priority to U.S. Provisional Patent Application No. 63/384,484, filed Nov. 21, 2022, and titled "APPARATUS AND METHODS FOR STAIRCASE ANTENNAS," the entirety of which is hereby incorporated herein by reference.

FIELD OF THE DISCLOSURE

Embodiments of the invention relate to electronic systems, and more particularly, to antennas for radio frequency (RF) communications.

BACKGROUND

Antennas can be used in a wide variety of applications to transmit and/or receive radio frequency (RF) signals. Example applications using antennas include radar, satellite, military, and/or cellular communications.

SUMMARY OF THE DISCLOSURE

Staircase antennas are disclosed herein. In certain embodiments, patch antenna elements are formed on two or more conductive layers of a circuit board with the patch antenna elements interconnected by vias to form a staircase-shaped antenna. The staircase antenna communicates using a tilted beam during normal operation (for instance, with no phase shift). Thus, the staircase antenna radiates at an angle, for instance, a diagonal relative to a planar surface of the circuit board. Accordingly, the staircase antenna radiates with a tilted beam without needing to use electronic or mechanical steering. When multiple staircase antennas are included in an array, electronic steering can be further used to tilt the beam relative to the nominal tilting angle. The staircase antenna can be small, formed using printed circuit board (PCB) technology, and/or suitable for implementation as a surface mount technology (SMT) component. Furthermore, in certain implementations, the staircase antenna can be implemented to transmit and/or receive using multiple signal polarizations.

In one aspect, a circuit board is provided. The circuit board includes a plurality of conductive layers separated by dielectric, a first patch antenna formed on a first conductive layer of the plurality of conductive layers, a second patch antenna formed on a second conductive layer of the plurality of conductive layers, a first via connected to the first patch antenna and configured to carry a radio frequency (RF) signal, and a second via connecting the first patch antenna to the second patch antenna.

In another aspect, a method of antenna formation is disclosed. The method includes forming a first via in a circuit board, the first via configured to handle a radio frequency (RF) signal, forming a first patch antenna on a first conductive layer of the circuit board, the first patch antenna connected to the first via, forming a second via in the circuit board, the second via connected to the first patch antenna, and forming a second patch antenna on a second conductive layer of the circuit board, the second patch antenna connected to the second via.

In another aspect, a staircase antenna structure is disclosed. The staircase antenna structure includes a first patch antenna formed on a first conductive layer, a second patch antenna formed on a second conductive layer, a first via connected to the first patch antenna and configured to carry a radio frequency (RF) signal, and a second via connecting the first patch antenna to the second patch antenna.

DETAILED DESCRIPTION OF EMBODIMENTS

The following detailed description of embodiments presents various descriptions of specific embodiments of the invention. However, the invention can be embodied in a multitude of different ways. In this description, reference is made to the drawings. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Figure 1:
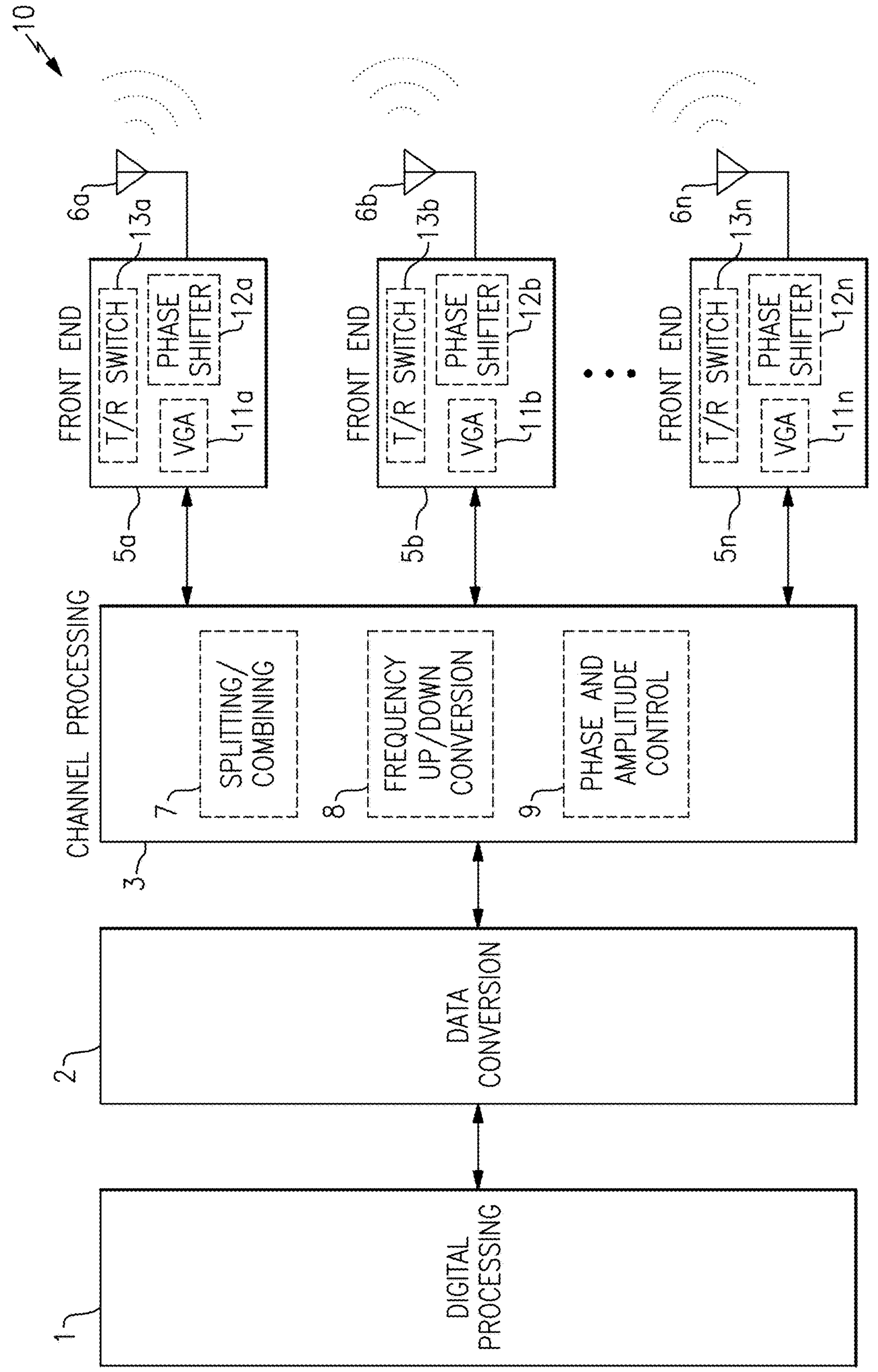
FIG. 1 is a schematic diagram of one embodiment of a phased array antenna system.

FIG. 1 is a schematic diagram of one embodiment of a phased array antenna system 10. The phased array antenna system 10 includes a digital processing circuit 1, a data conversion circuit 2, a channel processing circuit 3, RF front ends 5*a*, 5*b*, . . . 5*n*, and antennas 6*a*, 6*b*, . . . 6*n*. Although an example system with three RF front ends and three antennas is illustrated, the phased array antenna system 10 can include more or fewer RF front ends and/or more or fewer antennas as indicated by the ellipses. Furthermore, in certain implementations, the phased array antenna system 10 is implemented with separate antennas for transmitting and receiving signals.

The phased array antenna system 10 illustrates one embodiment of an electronic system that can include one or more staircase antennas implemented in accordance with the teachings herein. However, the staircase antennas disclosed herein can be used in a wide range of electronics. A phased array antenna system is also referred to herein as an active scanned electronically steered array or beamforming communication system.

As shown in FIG. 1, the channel processing circuit 3 is coupled to antennas 6*a*, 6*b*, . . . 6*n* through RF front ends 5*a*, 5*b*, . . . 5*n*, respectively. The channel processing circuit 3 includes a splitting/combining circuit 7, a frequency up/down conversion circuit 8, and a phase and amplitude control circuit 9, in this embodiment. The channel processing circuit 3 provides RF signal processing of RF signals transmitted by and received from each communication channel. In the illustrated embodiment, each communication channel is associated with a corresponding RF front end and antenna. However, other implementations are possible.

With continuing reference to FIG. 1, the digital processing circuit 1 generates digital transmit data for controlling a transmit beam radiated from the antennas 6*a*, 6*b*, . . . 6*n*. The digital processing circuit 1 also processes digital receive data representing a receive beam received by the antennas 6*a*, 6*b*, . . . 6*n*. In certain implementations, the digital processing circuit 1 includes one or more baseband processors.

As shown in FIG. 1, the digital processing circuit 1 is coupled to the data conversion circuit 2, which can include digital-to-analog converter (DAC) circuitry for converting digital transmit data to one or more baseband transmit signals and analog-to-digital converter (ADC) circuitry for converting one or more baseband receive signals to digital receive data.

The frequency up/down conversion circuit 8 provides frequency upshifting from baseband to RF and frequency downshifting from RF to baseband, in this embodiment. However, other implementations are possible, such as configurations in which the phased array antenna system 10 operates in part at an intermediate frequency (IF) or in which RF data converters provide direct conversion between digital and RF. In certain implementations, the splitting/combining circuit 7 provides splitting to one or more frequency upshifted transmit signals to generate RF signals suitable for processing by the RF front ends 5*a*, 5*b*, . . . 5*n* and subsequent transmission on the antennas 6*a*, 6*b*, . . . 6*n*. Additionally, the splitting/combining circuit 7 combines RF signals received vias the antennas 6*a*, 6*b*, . . . 6*n* and RF front ends 5*a*, 5*b*, . . . 5*n* to generate one or more baseband receive signals for the data conversion circuit 2.

The channel processing circuit 3 also includes the phase and amplitude control circuit 9 for controlling beamforming operations. For example, the phase and amplitude control circuit 9 controls the amplitudes and phases of RF signals transmitted or received via the antennas 6*a*, 6*b*, . . . 6*n* to provide beamforming.

With respect to signal transmission, the RF signals radiated from the antennas 6*a*, 6*b*, . . . 6*n* aggregate through constructive and destructive interference to collectively generate a transmit beam having a particular direction. With respect to signal reception, the channel processing circuit 3 generates a receive beam by combining the RF signals received from the antennas 6*a*, 6*b*, . . . 6*n* after amplitude scaling and phase shifting.

Phased array antenna systems are used in a wide variety of applications including, but not limited to, mobile communications, military and defense systems, and/or radar technology.

As shown in FIG. 1, the RF front ends 5*a*, 5*b*, . . . 5*n* each include one or more VGAs 11*a*, 11*b*, . . . 11*n*, which are used to scale the amplitude of RF signals transmitted or received by the antennas 6*a*, 6*b*, . . . 6*n*, respectively. Additionally, the RF front ends 5*a*, 5*b*, . . . 5*n* each include one or more phase shifters 12*a*, 12*b*, . . . 12*n*, respectively, for phase-shifting the RF signals. For example, in certain implementations, the phase and amplitude control circuit 9 generates gain control signals for controlling the amount of gain provided by the VGAs 11*a*, 11*b*, . . . 11*n* and phase control signals for controlling the amount of phase shifting provided by the phase shifters 12*a*, 12*b*, . . . 12*n*.

The phased array antenna system 10 operates to generate a transmit beam and/or receive beam including a main lobe pointed in a desired direction of communication. The phased array antenna system 10 realizes increased signal to noise (SNR) ratio in the direction of the main lobe. The transmit beam and/or receive beam also includes one or more side lobes, which point in different directions than the main lobe and are undesirable.

An accuracy of beam direction of the phased array antenna system 10 is based on a precision in controlling the gain and phases of the RF signals communicated via the antennas 6*a*, 6*b*, . . . 6*n*. For example, when one or more of the RF signals has a large phase error, the beam can be broken and/or pointed in an incorrect direction. Furthermore, the size or magnitude of beam side lobe levels is based on an accuracy in controlling the phases and amplitudes of the RF signals.

Accordingly, it is desirable to tightly control the phase and amplitude of RF signals communicated by the antennas 6*a*, 6*b*, . . . 6*n* to provide robust beamforming operations.

Although the RF amplifiers herein can be used in beamforming communications, the teachings herein are also applicable to other types of electronic systems.

Figure 2A:
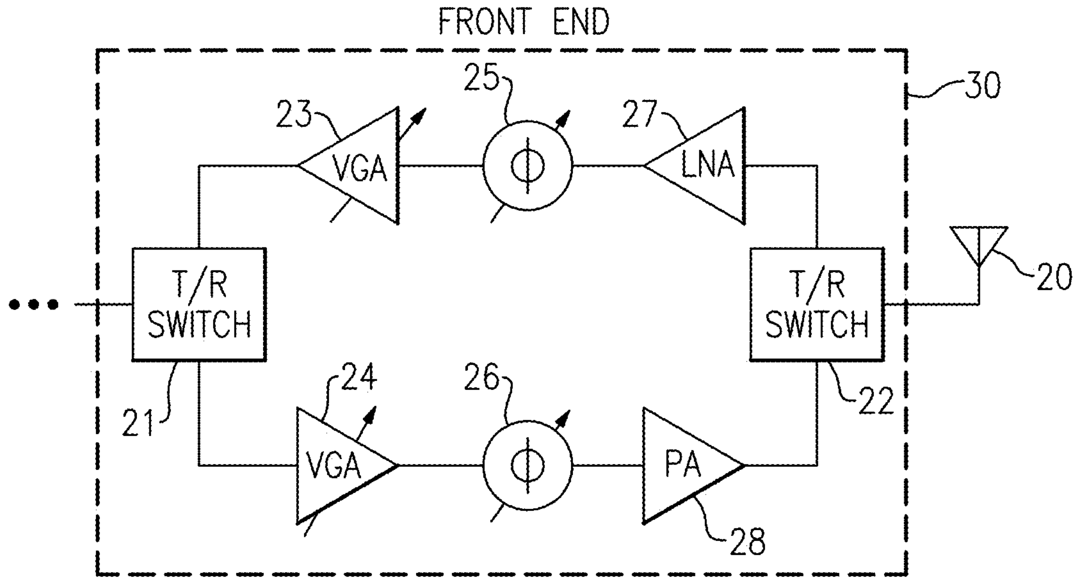
FIG. 2A is a schematic diagram of one embodiment of a front end system.

FIG. 2A is a schematic diagram of one embodiment of a front end system 30. The front end system 30 includes a first transmit/receive (T/R) switch 21, a second transmit/receive switch 22, a receive-path VGA 23, a transmit-path VGA 24, a receive-path controllable phase shifter 25, a transmit-path phase shifter 26, a low noise amplifier (LNA) 27, and a power amplifier (PA) 28. As shown in FIG. 2A, the front end system 30 is depicted as being coupled to an antenna 20.

The antenna 20 can correspond to a staircase antenna implemented in accordance with any of the embodiments herein. Although FIG. 2A depicts one example of a front-end system that can transmit and receive RF signals, the staircase antennas herein can operate in combination with a wide variety of types of RF front ends. Accordingly, other implementations are possible.

The front end system 30 can be included in a wide variety of RF systems, including, but not limited to, phased array antenna systems, such as the phased array antenna system 10 of FIG. 1. For example, multiple instantiations of the front end system 30 can be used to implement the RF front ends 5*a*, 5*b*, . . . 5*n* of FIG. 1. In certain implementations, one or more instantiations of the front end system 30 are fabricated on a semiconductor die or chip.

As shown in FIG. 2A, the front end system 30 includes the receive-path VGA 23 for controlling an amount of amplification provided to an RF input signal received on the antenna 20, and the transmit-path VGA 24 for controlling an amount of amplification provided to an RF output signal transmitted on the antenna 20. Additionally, the front end system 30 includes the receive-path controllable phase shifter 25 for controlling an amount of phase shift to an RF input signal received on the antenna 20, and the transmit-path controllable phase shifter 26 for controlling an amount of phase shift provided to the RF output signal transmitted on the antenna 20.

The gain control provided by the VGAs and the phase control provided by the phase shifters can serve a wide variety of purposes including, but not limited to, compensating for temperature and/or process variation. Moreover, in beamforming applications, the VGAs and phase shifters can control side-lobe levels of a beam pattern.

Figure 2B:
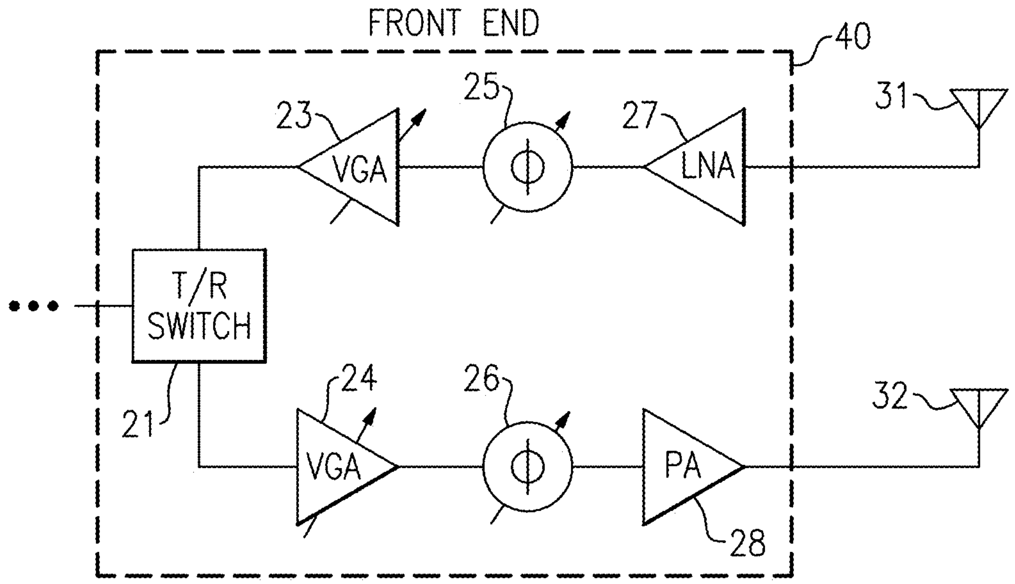
FIG. 2B is a schematic diagram of another embodiment of a front end system.

FIG. 2B is a schematic diagram of another embodiment of a front end system 35. The front end system 35 of FIG. 2B is similar to the front end system 30 of FIG. 2A, except that the front end system 35 omits the second transmit/receive switch 22. As shown in FIG. 2B, the front end system 35 is depicted as being coupled to a receive antenna 31 and to a transmit antenna 32.

The receive antenna 31 and/or the transmit antenna 32 can correspond to a staircase antenna implemented in accordance with any of the embodiments herein. Although FIG. 2B depicts another example of a front-end system that can transmit and receive RF signals on stair case antennas, the staircase antennas herein can operate in combination with a wide variety of types of RF front ends. Accordingly, other implementations are possible.

The front end system 35 operates with different antennas for signal transmission and reception. In the illustrated embodiment, the receive-path VGA 23 controls an amount of amplification provided to an RF input signal received on the receive antenna 31, and the transmit-path VGA 24 controls an amount of amplification provided to an RF output signal transmitted on the second antenna 32. Additionally, the receive-path phase shifter 25 controls an amount of phase shift provided to the RF input signal received on the receive antenna 31, and the transmit-path phase shifter 26 controls an amount of phase shift provided to an RF output signal transmitted on the second antenna 32.

Certain RF systems include separate antennas for transmission and reception of signals.

In certain applications, it is desirable to tilt a beam communicated from the antenna. For example, antennas with down-tilted beams are attractive for high altitude applications such as base-station towers, indoor access points, and/or roof top communications equipment.

Beam tilting can be achieved either electronically or mechanically. For example, in contrast to electronic tilting, mechanical tilting preserves the gain for the beam under scanning angles. Thus, mechanical tilting does not encounter the problem of grating lobe appearance in case of an array, and consequently has a wider scan range compared to electronic tilting. However, mechanical tilting can be costly, complex, and/or have a large implementation area.

Staircase antennas are disclosed herein. In certain embodiments, patch antenna elements are formed on two or more conductive layers of a circuit board with the patch antenna elements interconnected by vias to form a staircase-shaped antenna. The staircase antenna communicates using a tilted beam during normal operation (for instance, with no phase shift). Thus, the staircase antenna radiates at an angle, for instance, a diagonal relative to a planar surface of the circuit board.

Accordingly, the staircase antenna radiates with a tilted beam without needing to use electronic or mechanical steering. When multiple staircase antennas are included in an array, electronic steering can be further used to tilt the beam relative to the nominal tilting angle.

The staircase antenna can be small, formed using printed circuit board (PCB) technology, and/or suitable for implementation as a surface mount technology (SMT) component.

Furthermore, in certain implementations, the staircase antenna can be implemented to transmit and/or receive using multiple signal polarizations. In one example, the staircase antenna can include antennas patches, signal feeds, and other structures to support horizontal and vertical antenna polarizations.

Figure 3A:
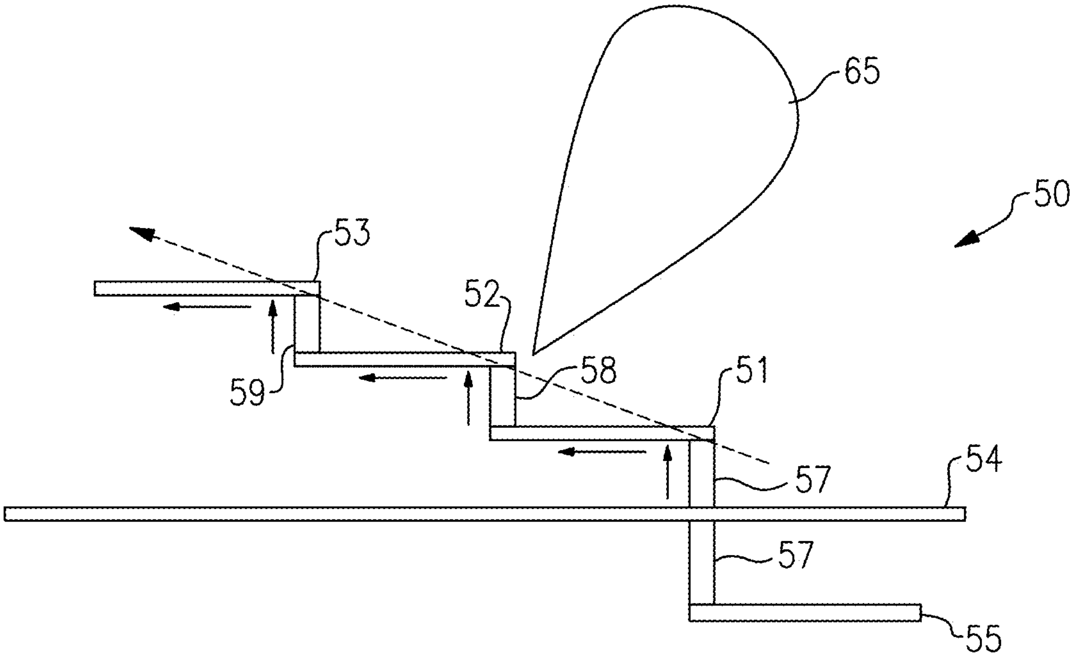
FIG. 3A is a schematic diagram of one embodiment of a staircase antenna forming a tilted beam.

FIG. 3A is a schematic diagram of one embodiment of a staircase antenna 50 forming a tilted beam 65. The staircase antenna 50 includes a first patch antenna 51, a second patch antenna 52, a third patch antenna 53, a ground plane 54, a signal source 55, a first via 57, a second via 58, and a third via 59.

As shown in FIG. 3A, the first patch antenna 51, the second patch antenna 52, the third patch antenna 53, the ground plane 54, and the signal source 55 are on different conductive layers of the antenna structure. For example, the staircase antenna 50 can be formed on a printed circuit board (PCB), with each patch antenna formed on a different conductive layer of the PCB. Thus, the staircase antenna can be realized using PCB technologies by using patches on different layers interconnected by vias, with the patches corresponding to steps of the staircase antenna.

In the illustrated embodiment, the first via 57 passes through an opening in the ground plane 54 to connect the signal source 55 to the first patch antenna 51. Additionally, the second via 58 connects the first patch antenna 51 to the second patch antenna 52, and the third via 59 connects the second patch antenna 52 to the third patch antenna 53. The patch antennas 51-53 are offset from one another to form a staircase. For example, with respect to an x-y plane orientated with the drawing, the patch antennas 51-53 are offset from one another in both the x-direction and the y-direction and interconnected by the vias 57-59 to form a staircase shape.

As shown in FIG. 3A, the first patch antenna 51 is wider than the second patch antenna 52, and the second patch antenna 52 is wider than the third patch antenna 53. The total number of and the width of the patch antennas can be selected during design to achieve a desired antenna radiation pattern, including a nominal beam angle.

The signal source 55 provides an RF signal to the patch antenna elements 51-53 through the vias 57-59. The distribution on the staircase patch antenna structure can be approximated by an equivalent inclined current. As shown in FIG. 3A, the applied RF signal from the signal source 55 results in radiation of the tilted beam 65 from the staircase antenna 50 at a diagonal.

In the illustrated embodiment, beam tilting is achieved by using a staircase of patch antennas that approximate an incline. Although an implementation with three patch antennas is shown, more or fewer patch antennas can be included in the staircase antenna.

When packaged as a surface mount device (SMD), the antenna can be conformal to the customer board while providing a tilted beam without requiring special construction or mechanical tilt.

Figure 3B:
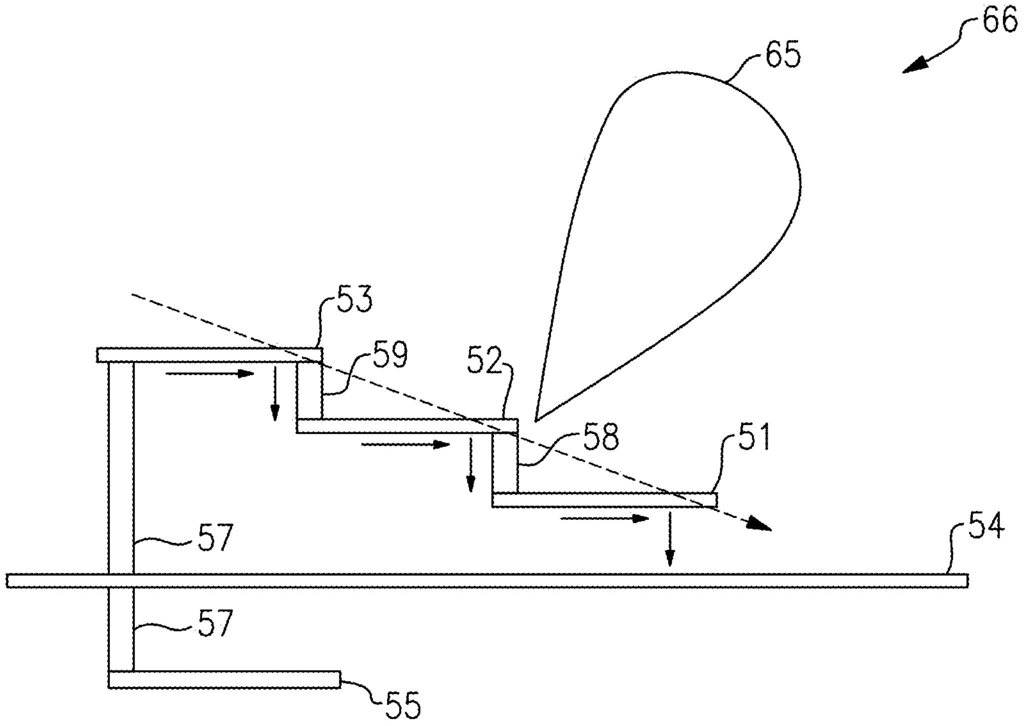
FIG. 3B is a schematic diagram of another embodiment of a staircase antenna forming a tilted beam.

FIG. 3B is a schematic diagram of another embodiment of a staircase antenna 66 forming a tilted beam 65. The staircase antenna 66 includes a first patch antenna 51, a second patch antenna 52, a third patch antenna 53, a ground plane 54, a signal source 55, a first via 57, a second via 58, and a third via 59.

The staircase antenna 66 of FIG. 3B is similar to the staircase antenna 50 of FIG. 3A, except that the staircase antenna 66 of FIG. 3B depicts a differential implementation of signal feeding. For example, in FIG. 3A the feed is applied to the bottom patch of the stack while in FIG. 3B the feed is applied to the top patch of the stack. Any of the staircase antennas herein can be contacted at the top, bottom, or other suitable location of the staircase structure.

Thus, in some embodiments, a staircase antenna may be excited by a via going to the top patch in contrast to the embodiment in which the via goes to the bottom patch. This creates phase-reversed radiated fields due to the reversed current directions.

Furthermore, when the embodiments of FIGS. 3A and 3B are combined in the array environment, the cross-polarized fields are further suppressed achieving an overall excellent cross-polarization discrimination (XPD) for the array even under electronic beam scan to directions further to the inherently tilted direction with respect to the board boresight, either in azimuth or in elevation.

Figure 4:
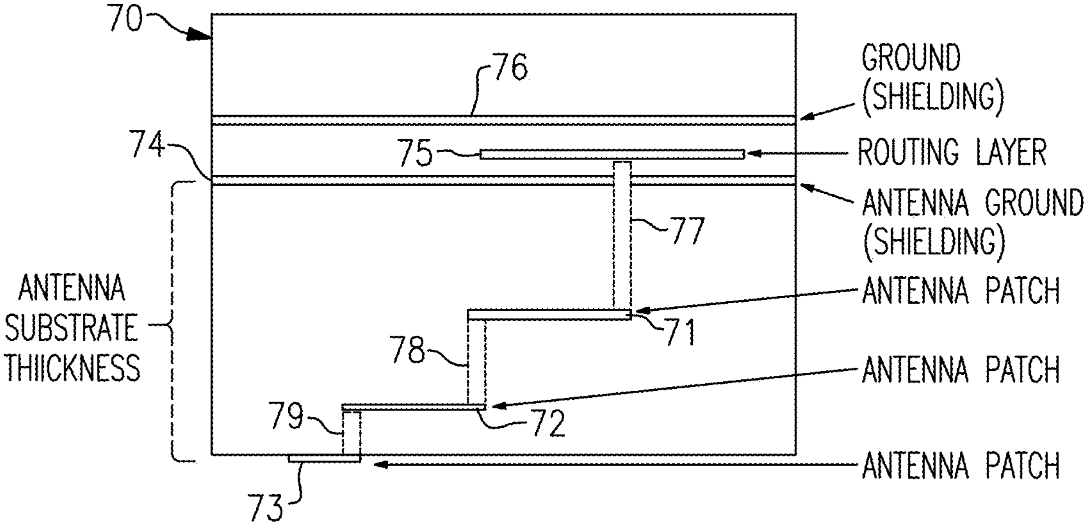
FIG. 4 is a schematic diagram of a circuit board with a staircase antenna according to one embodiment.

FIG. 4 is a schematic diagram of a circuit board 70 with a staircase antenna according to one embodiment. The circuit board 70 includes a plurality of conductive layers separated by dielectric. The dielectric can be any suitable circuit board dielectric.

As shown in FIG. 4, a grounded shielding structure 76 is formed on a first conductive layer, signal routes 75 are formed on a second conductive layer, an antenna ground plane 74 is formed on a third conductive layer, a first patch antenna 71 is formed on a fourth conductive layer, a second patch antenna 72 is formed on a fifth conductive layer, and a third patch antenna 73 is formed on a sixth conductive layer. Additionally, a first via 77 passes through an opening in the antenna ground plane 74 to connect the signal routes 75 to a first side of the first patch antenna 71. Furthermore, a second via 78 connects a second side of the first patch antenna 71 to a first side of the second patch antenna 72, and a third via 79 connects a second side of the second patch antenna 72 to a first side of the third patch antenna 73.

The circuit board 70 can be formed as a PCB, with each patch antenna formed on a different conductive layer of the PCB. Thus, the staircase antenna can be realized on PCB technologies by using patches on different layers connected by vias.

Figure 5A:
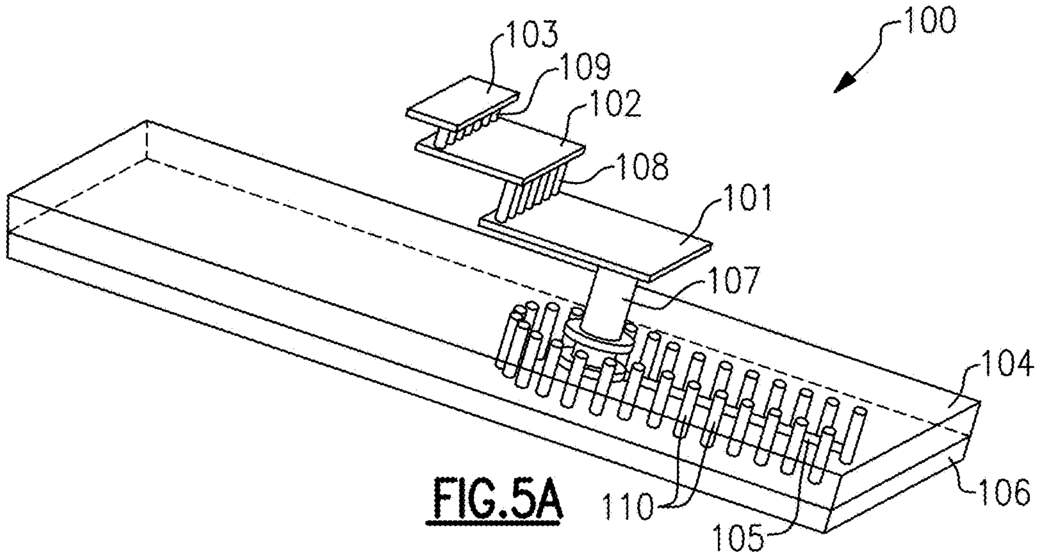
FIG. 5A is a perspective view of a circuit board with a staircase antenna according to another embodiment.
Figure 5B:
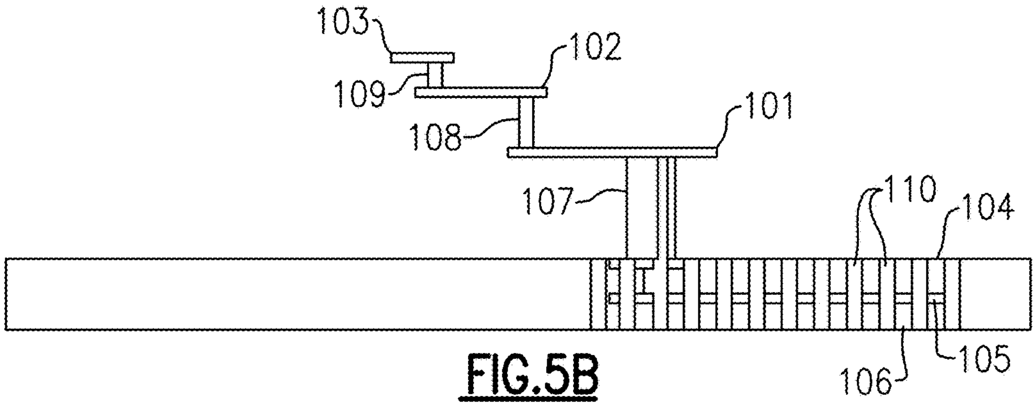
FIG. 5B is a cross-section of the circuit board of FIG. 5A.
Figure 5C:
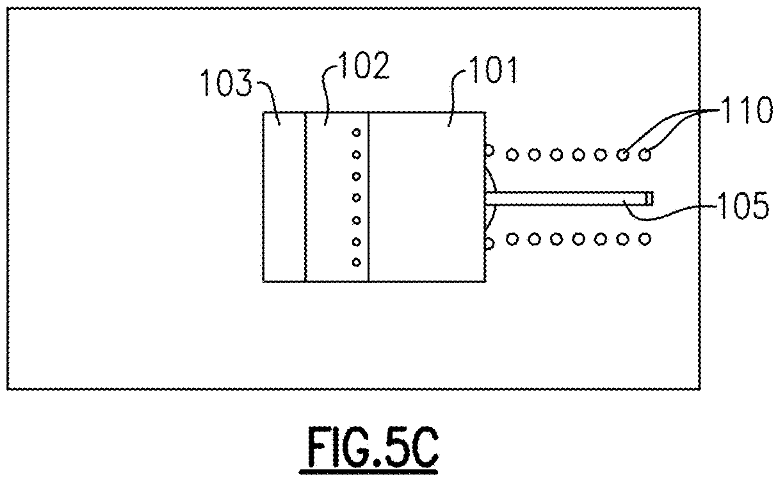
FIG. 5C is a plan view of the circuit board of FIG. 5A.

FIG. 5A is a perspective view of a circuit board 100 with a staircase antenna according to another embodiment. FIG. 5B is a cross-section of the circuit board 100 of FIG. 5A. FIG. 5C is a plan view of the circuit board 100 of FIG. 5A.

With reference to FIGS. 5A-5C, the circuit board 100 includes a first patch antenna 101, a second patch antenna 102, a third patch antenna 103, a signal route 105, a first via 107, a second via 108, a third via 109, a top ground shield 104, a bottom ground shield 106, and a grounded via cage 110.

The circuit board 100 of FIGS. 5A-5C includes a patch antenna staircase structure similar to that of the circuit board 70 of FIG. 4.

As shown in FIG. 5A, the first via 107 connects the first patch antenna 101 to the signal route 105, which is shielded as a Faraday cage. In particular, a top of the Faraday cage is formed by the top ground shield 104, the bottom of the Faraday cage is formed by the bottom ground shield 106, and the sides or walls of the Faraday cage are formed by the grounded via cage 110. Thus, the signal route 105 is surrounded on all sides by grounded conductors to enhance isolation and/or other RF signaling performance characteristics.

Although certain embodiments above have been depicted in the context of single polarization staircase antennas, the teachings herein are also applicable to dual polarization staircase antennas, such as those transmitting and/or receiving using both horizontal and vertical polarizations.

Figures 6A, 6B, 6C, 6D:
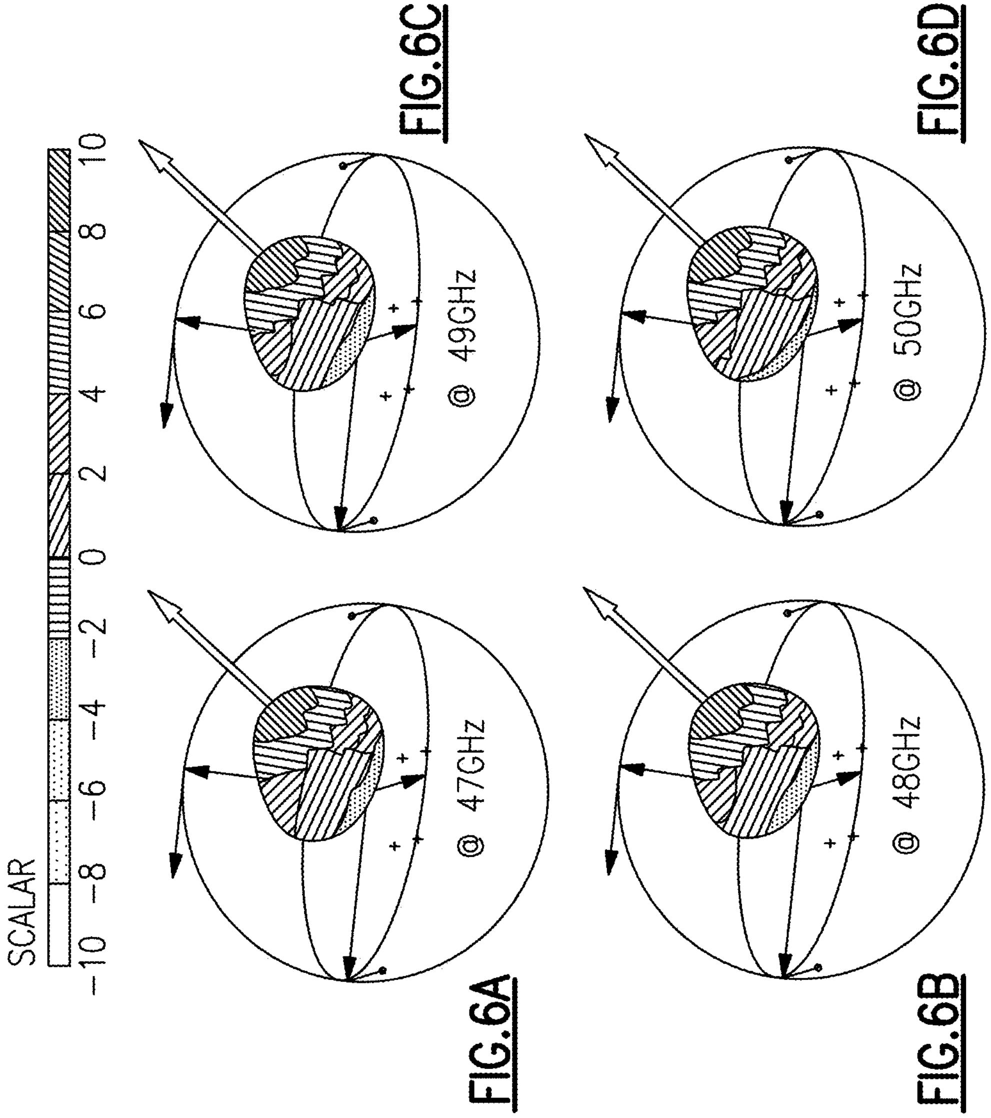
FIG. 6A is a graph of one example of a radiation pattern for a staircase antenna transmitting at 47 GHz.
FIG. 6B is a graph of one example of a radiation pattern for a staircase antenna transmitting at 48 GHz.
FIG. 6C is a graph of one example of a radiation pattern for a staircase antenna transmitting at 49 GHz.
FIG. 6D is a graph of one example of a radiation pattern for a staircase antenna transmitting at 50 GHz.

FIG. 6A is a graph of one example of a radiation pattern for a staircase antenna transmitting at 47 GHz.

FIG. 6B is a graph of one example of a radiation pattern for a staircase antenna transmitting at 48 GHz.

FIG. 6C is a graph of one example of a radiation pattern for a staircase antenna transmitting at 49 GHz.

FIG. 6D is a graph of one example of a radiation pattern for a staircase antenna transmitting at 50 GHz.

As shown in FIGS. 6A-6D, the staircase antenna radiates at a tilted angle without steering. Furthermore, the staircase antenna radiates a consistent pattern across a range of frequency, thus exhibiting excellent antenna radiation characteristics. In this example, the RF signal is a millimeter wave signal.

Figures 7A, 7B, 7C, 7D:
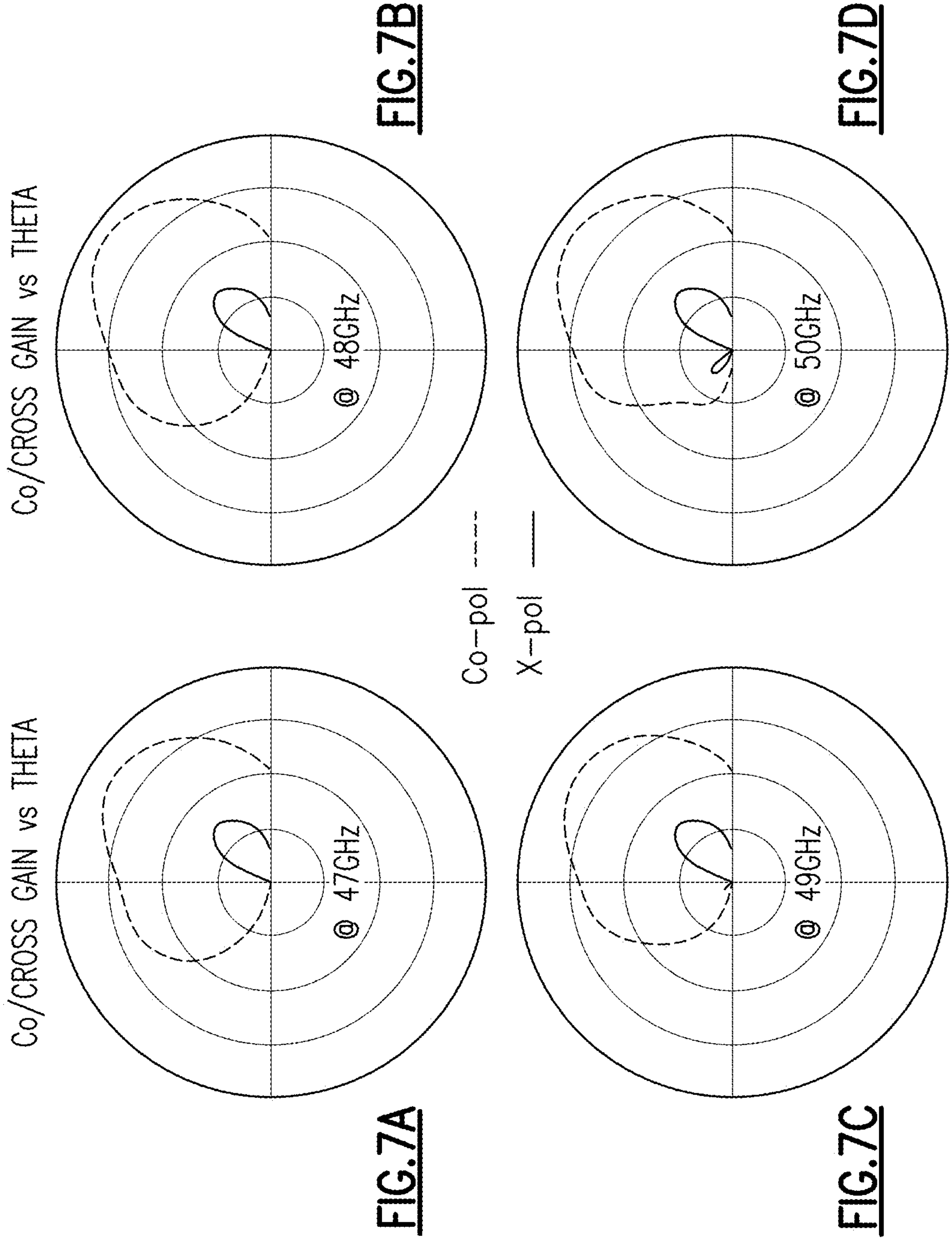
FIG. 7A is a polar plot of one example of the co-polarized and cross-polarized radiated fields for a staircase antenna operating at 47 GHz.
FIG. 7B is a polar plot of one example of the co-polarized and cross-polarized radiated fields for a staircase antenna operating at 48 GHz.
FIG. 7C is a polar plot of one example of the co-polarized and cross-polarized radiated fields for a staircase antenna operating at 49 GHz.
FIG. 7D is a polar plot of one example of the co-polarized and cross-polarized radiated fields for a staircase antenna operating at 50 GHz.

FIG. 7A is a polar plot of one example of the co-polarized and cross-polarized radiated fields for a staircase antenna operating at 47 GHz.

FIG. 7B is a polar plot of one example of the co-polarized and cross-polarized radiated fields for a staircase antenna operating at 48 GHz.

FIG. 7C is a polar plot of one example of the co-polarized and cross-polarized radiated fields or a staircase antenna operating at 49 GHz.

FIG. 7D is a polar plot of one example of the co-polarized and cross-polarized radiated fields for a staircase antenna operating at 50 GHz.

Figure 7E:
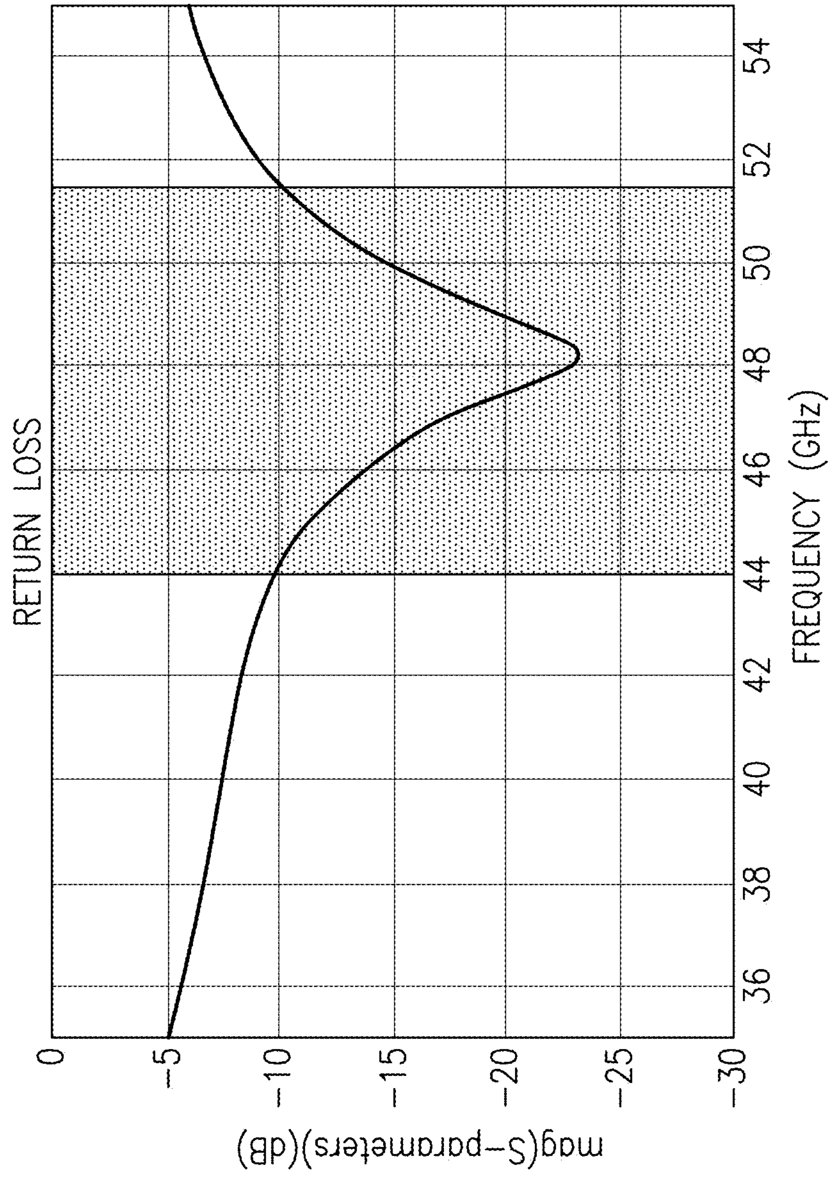
FIG. 7E is a rectangular plot of one example of return loss versus frequency for a staircase antenna.

FIG. 7E is a rectangular plot of one example of return loss versus frequency for a staircase antenna.

As shown in FIGS. 7A-7D, the co-polarized fields achieve a desired beam tilt of more than 40 degrees from boresight for certain embodiment of the staircase shape (the relative size of the stair steps at the specific frequency range). This is achieved while maintaining an acceptable level of cross-polarized fields.

Moreover, as shown in FIG. 7E, the staircase antenna exhibits good return loss characteristics across frequency. Thus, the staircase antenna is suitable for a wide range of applications and deployment scenarios.

As discussed above, two or more staircase antennas can be arranged in array. Additionally, with respect to signal transmission, the gain and phase of the RF signal provided to each staircase antenna of the array can be controlled to provide electronic steering. Furthermore, with respect to signal reception, the gain and phase applied to each RF signal received by a staircase antenna of the array can be controlled to provide electronic steering. Such electronic steering can be used to tilt the beam of the antenna array relative to a nominal angle associated with no phase shift. Advantageously, the nominal angle is tilted even when each antenna of the array has no phase shift. In contrast, an antenna array without such a tilt suffers from poor beam gain for large scanning angles away from the boresight.

Furthermore, in some embodiments, an array includes a mix of staircase antennas excited by a via going to the top patch and staircase antennas in which the via goes to the bottom patch. When these two embodiments are combined in the array environment, the cross-polarized fields are further suppressed achieving an overall excellent cross-polarization discrimination (XPD) for the array even under electronic beam scan to directions further to the inherently tilted direction with respect to the board boresight, either in azimuth or in elevation.

Figure 8:
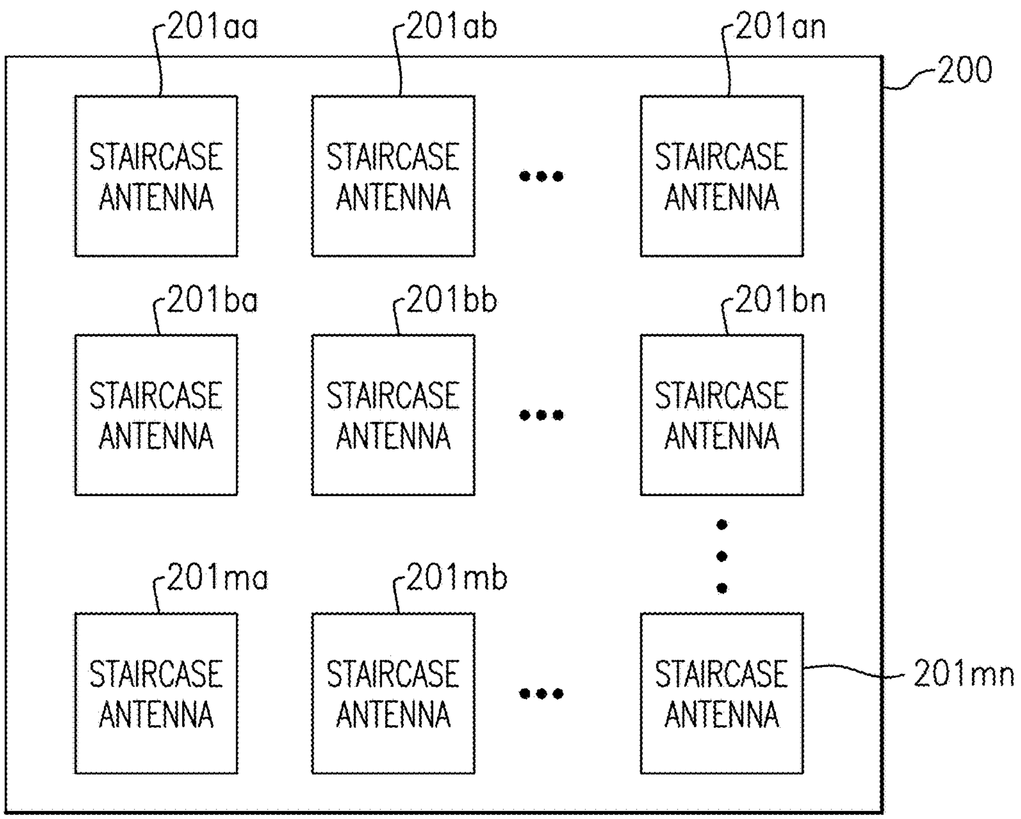
FIG. 8 is a schematic diagram of one embodiment of a circuit board with a staircase antenna array.

FIG. 8 is a schematic diagram of one embodiment of a circuit board 200 with a staircase antenna array. The circuit board 200 includes an antenna array (m by n, in this example) including staircase antennas 201*aa*, 201*ab*, . . . 201*an*, 201*ba*, 201*bb*, . . . 201*bn*, . . . 201*ma*, 201*mb*, . . . 201*mn*. The antenna array can be any suitable size, with m and n each being an integer greater than or equal to 1. The integers m and n can be the same or different. In certain implementations, m and n are each greater than or equal to 2. In one example, m is 8 and n is 2.

In certain implementations, the antenna array includes a mix of staircase antennas excited by a via going to the top patch and staircase antennas in which the via goes to the bottom patch. In one example, one type of staircase antenna is used for odd elements of the antenna array (when i+j is odd for antenna element 201*ij*) while the other type of staircase antenna is used for even elements of the antenna array (when i+j is even for antenna element 201*ij*). In such a configuration, no antenna elements of the same type are immediately adjacent to one another, which achieves an enhancement in cross-polarization.

Figure 9A:
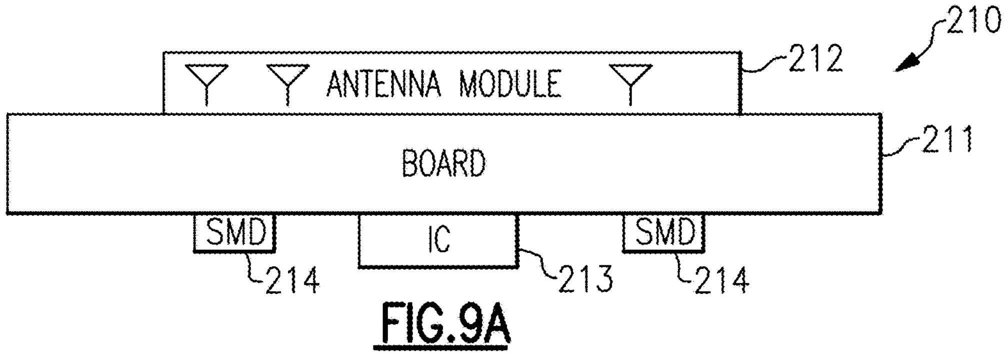
FIG. 9A is a schematic diagram of one embodiment of an RF module.

FIG. 9A is a schematic diagram of one embodiment of an RF module 210. The RF module 210 includes a customer circuit board 211 having a first side to which various circuit components are attached. In this example, an integrated circuit (IC) 213 (also referred to herein as a semiconductor die) and various surface mount devices (SMDs) are attached to the first side of the customer circuit board 211. Additionally, an antenna module 212 including one or more staircase antennas is attached to a second side of the customer circuit board 211 opposite the first side. The IC 213 can include RF circuitry (for example, any of the circuitry shown in FIGS. 1-2B) for conditioning RF signals transmitted from and/or received by the antenna module 212. Such conditioning can include, but is not limited to, amplification, phase-shifting, and/or filtering.

In certain implementations, staircase antennas are formed on a separate module that is attachable to a customer board. For example, in certain implementations, the module can be attachable using a land grid array (LGA), ball grid array (BGA), and/or other surface mount technology.

Figure 9B:
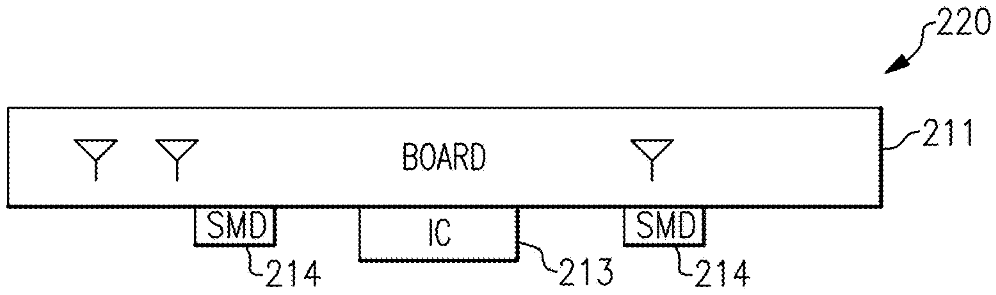
FIG. 9B is a schematic diagram of another embodiment of an RF module.

FIG. 9B is a schematic diagram of another embodiment of an RF module 220. The RF module 220 includes a customer circuit board 221 to which various components (for example, the IC 213 and SMDs 214) are attached. The RF module 220 of FIG. 9B is similar to the RF module 210 of FIG. 9A, except that in the RF module 220 of FIG. 9B the staircase antenna(s) are placed directly on the customer circuit board 221 rather than on a separate antenna module. Such staircase antenna(s) can be patterned as part of the customer circuit board's layers and/or directly mounted on the customer circuit board 221 as SMT components.

Figure 10A:
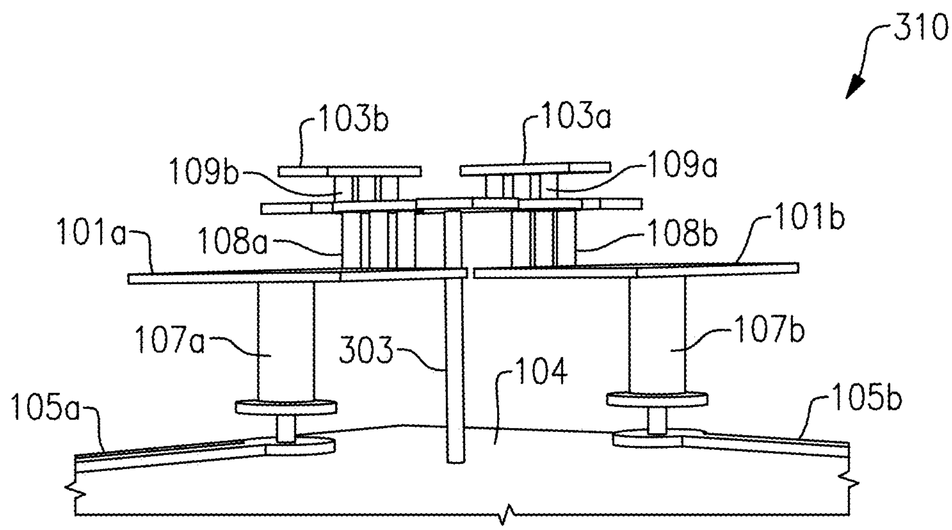
FIG. 10A is a cross-section of a circuit board with a staircase antenna according to another embodiment.
Figure 10B:
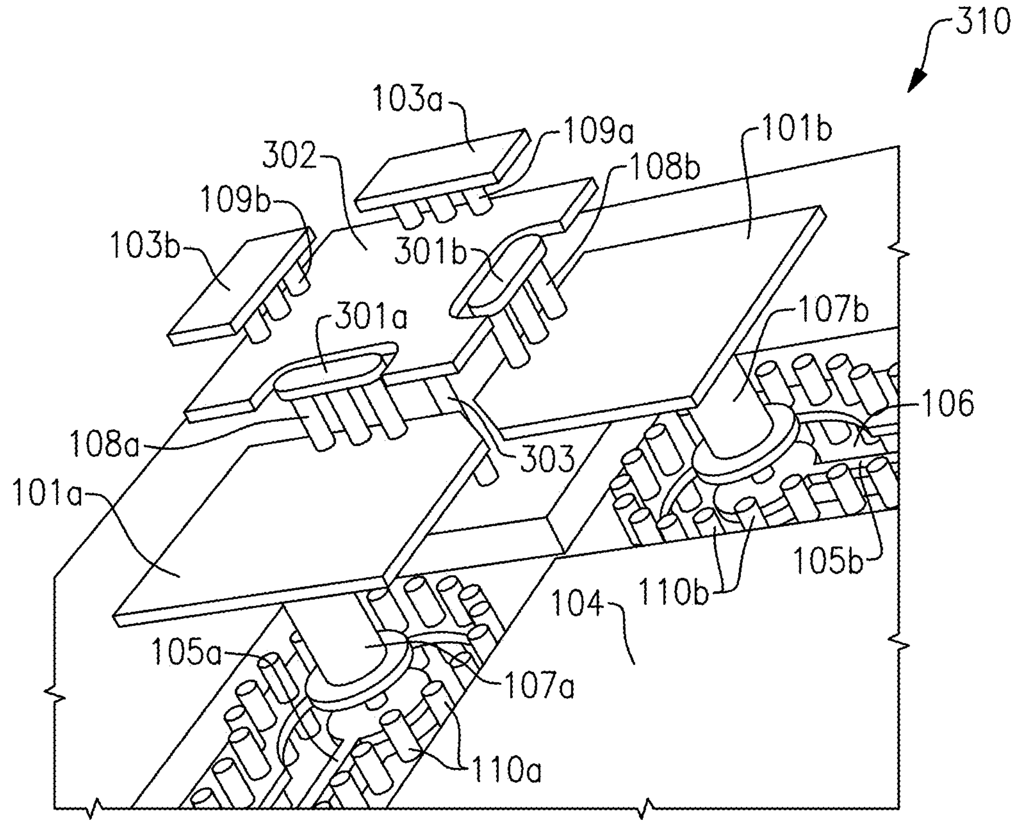
FIG. 10B is a perspective view of the circuit board of FIG. 10A with a portion of the circuit board removed.
Figure 10C:
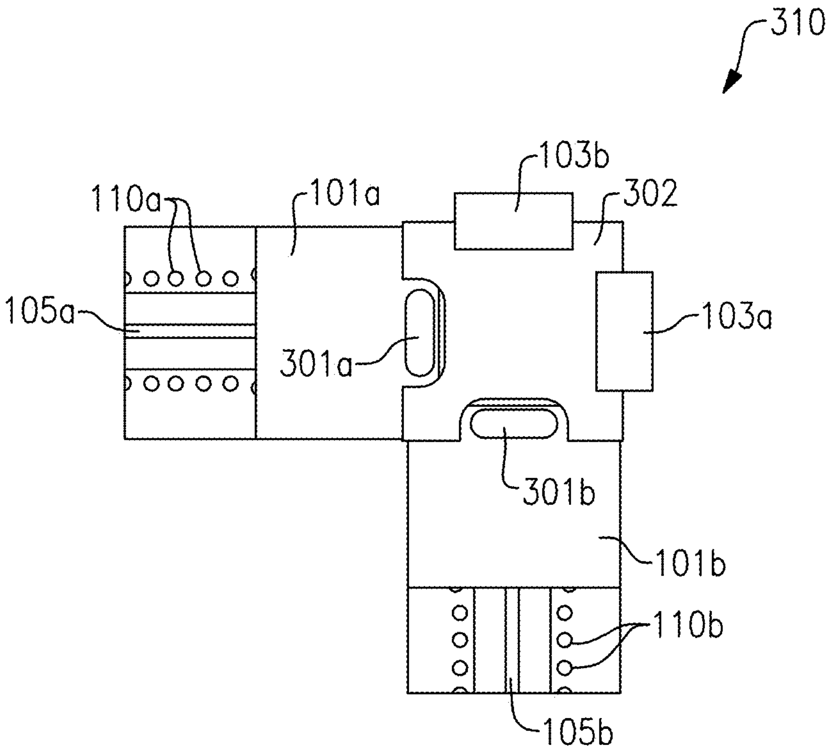
FIG. 10C is a plan view of the circuit board of FIG. 10B.
Figure 10D:
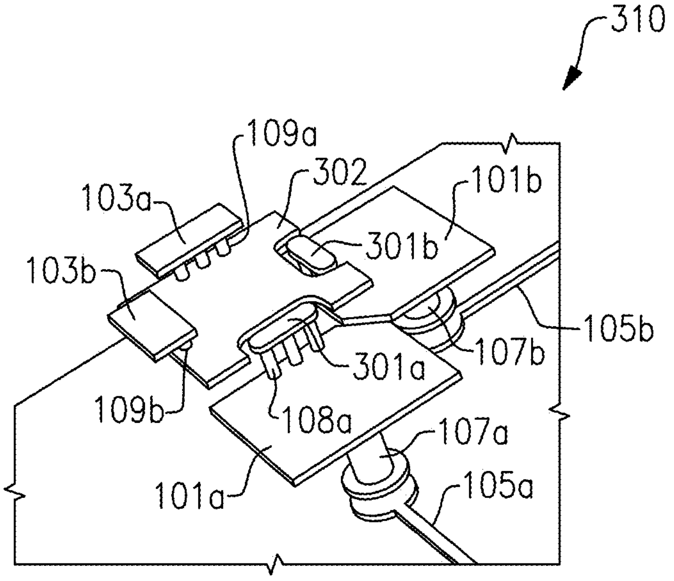
FIG. 10D is a perspective view of the circuit board of FIG. 10A.

FIG. 10A is a cross-section of a circuit board 310 with a staircase antenna according to another embodiment. FIG. 10B is a perspective view of the circuit board 310 of FIG. 10A with a portion of the circuit board removed. FIG. 10C is a plan view of the circuit board 310 of FIG. 10B. FIG. 10D is a perspective view of the circuit board 310 of FIG. 10A.

With reference to FIGS. 10A-10D, antenna structures are including for both a first antenna polarization and a second antenna polarization.

For example, with respect to a staircase antenna structure for the first antenna polarization (for example, a vertical polarization), the circuit board 310 includes a first patch antenna 101*a*, a first dyadic coupler 301*a* coupled to a second patch antenna 302, a third patch antenna 103*a*, a signal route 105*a*, a first via 107*a*, a second via 108*a*, a third via 109*a* and a grounded via cage 110*a*. Additionally, with respect to a staircase antenna structure for the second antenna polarization (for example, a horizontal polarization), the circuit board 310 includes a first patch antenna 101*b*, a second dyadic coupler 301*b* coupled to the second patch antenna 302 (which is shared with the staircase antenna structure for the first antenna polarization), a third patch antenna 103*b*, a signal route 105*b*, a first via 107*b*, a second via 108*b*, a third via 109*b*, and a grounded via cage 110*b*.

The circuit board 310 also includes a top ground shield 104, a bottom ground shield 106, and a grounding via 303 connecting the top ground shield 104 to the second patch antenna 302.

The circuit board 310 of FIGS. 10A-10D is similar to the circuit 100 of FIGS. 5A-5C, except that the circuit board 310 has been expanded to include two overlapping staircase antenna structures to achieve dual polarization, which enhances a communication system's capacity and/or diversity.

As shown in FIG. 10A-10D, the two overlapping staircase antenna structures have a ninety degree orientation difference, and share the middle patch 302. Furthermore, the dyadic couplers 301*a*-301*b* are used for feeding the RF signals of each polarization. Using the dyadic couplers 301*a*-301*b* for feeding while grounding the middle patch 302 using the grounding via 303 enhances isolation between the two signal polarizations.

Figure 11B:
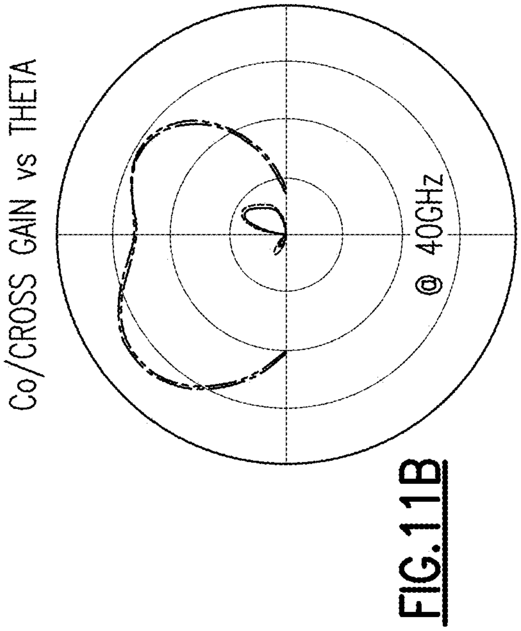
FIG. 11B is a polar plot of one example of the co-polarized and cross-polarized radiated fields for a staircase antenna operating at 40 GHz.
Figure 11C:
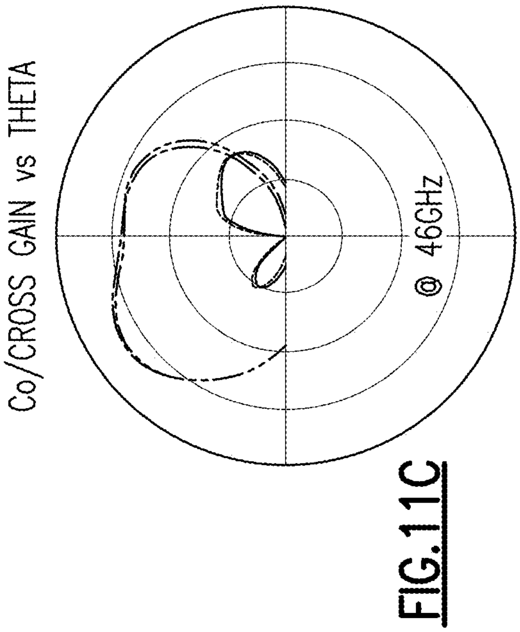
FIG. 11C is a polar plot of one example of the co-polarized and cross-polarized radiated fields for a staircase antenna operating at 46 GHz.
Figure 11A:
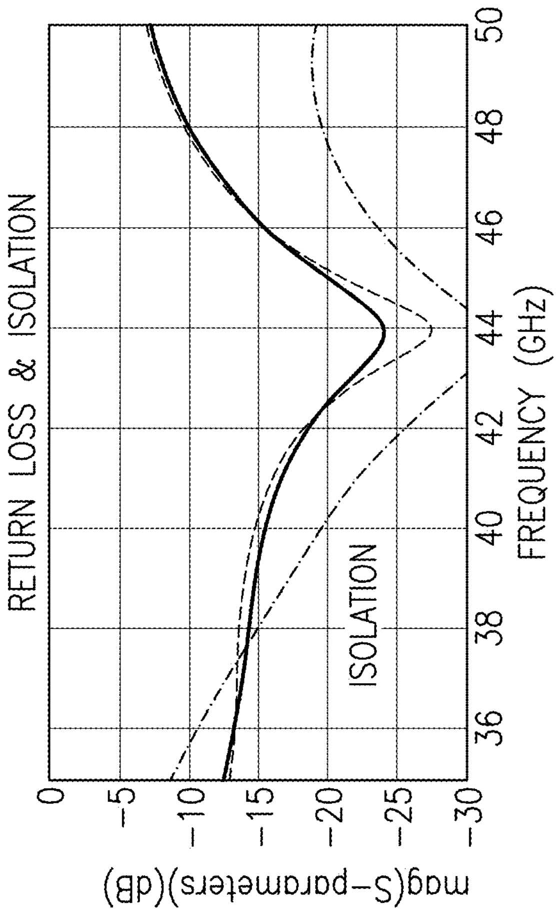
FIG. 11A is a rectangular plot of one example of return loss and isolation versus frequency for a staircase antenna.
Figure 11D:
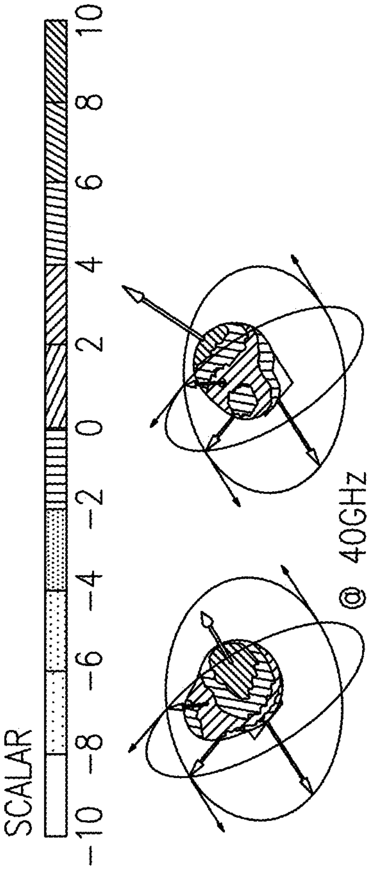
FIG. 11D is a graph of one example of a radiation pattern for a staircase antenna transmitting at 40 GHz.
Figure 11E:
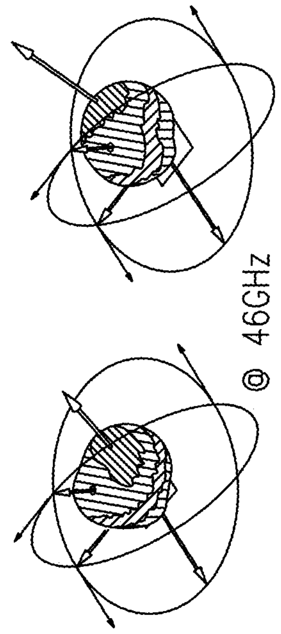
FIG. 11E is a graph of one example of a radiation pattern for a staircase antenna transmitting at 46 GHz.

FIG. 11A is a rectangular plot of one example of return loss and isolation versus frequency for a staircase antenna. FIG. 11B is a polar plot of one example of the co-polarized and cross-polarized radiated fields for a staircase antenna operating at 40 GHz. FIG. 11C is a polar plot of one example of the co-polarized and cross-polarized radiated fields for a staircase antenna operating at 46 GHz. FIG. 11D is a graph of one example of a radiation pattern for a staircase antenna transmitting at 40 GHz. FIG. 11E is a graph of one example of a radiation pattern for a staircase antenna transmitting at 46 GHz.

The graphs of FIGS. 11A-11E depict example simulation results for one implementation of the dual polarized antenna structure of FIGS. 10A-10D. As shown in FIGS. 11A-11E, the antenna exhibits good cross-polarization, return loss characteristics, and isolation.

Applications

Devices employing the above described schemes can be implemented into various electronic devices. Examples of electronic devices include, but are not limited to, RF communication systems, consumer electronic products, electronic test equipment, communication infrastructure, etc. For instance, one or more staircase antennas can be included in a wide range of RF communication systems, including, but not limited to, radar systems, base stations, mobile devices (for instance, smartphones or handsets), phased array antenna systems, laptop computers, tablets, and/or wearable electronics.

The teachings herein are applicable to RF communication systems operating over a wide range of frequencies, including not only RF signals between 100 MHz and 7 GHz, but also to higher frequencies, such as those in the X band (about 7 GHz to 12 GHz), the $K_u$ band (about 12 GHz to 18 GHz), the K band (about 18 GHz to 27 GHz), the $K_a$ band (about 27 GHz to 40 GHz), the V band (about 40 GHz to 75 GHz), and/or the W band (about 75 GHz to 110 GHz). Accordingly, the teachings herein are applicable to a wide variety of RF communication systems, including microwave communication systems.

The RF signals wirelessly communicated by the staircase antennas herein can be associated with a variety of communication standards, including, but not limited to, Global System for Mobile Communications (GSM), Enhanced Data Rates for GSM Evolution (EDGE), Code Division Multiple Access (CDMA), wideband CDMA (W-CDMA), 3G, Long Term Evolution (LTE), 4G, and/or 5G, as well as other proprietary and non-proprietary communications standards.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments.

What is claimed is:

1. A circuit board comprising:

a plurality of conductive layers separated by dielectric;

a first staircase antenna including a first patch antenna, a second patch antenna, and a third patch antenna as steps of the first staircase antenna, wherein the first patch antenna is formed on a first conductive layer of the plurality of conductive layers, wherein the second patch antenna is formed on a second conductive layer of the plurality of conductive layers and is laterally offset from the first patch antenna in a first direction, and wherein the third patch antenna is formed on a third conductive layer of the plurality of conductive layers and is laterally offset from the second patch antenna in the first direction, the third patch antenna laterally offset from the first patch antenna such that the third patch antenna and the first patch antenna are non-overlapping along the first direction;

a first via connected to the first patch antenna and configured to carry a radio frequency (RF) signal;

a second via connecting the first patch antenna to the second patch antenna and laterally offset from the first via in the first direction; and a third via connecting the second patch antenna to the third patch antenna and laterally offset from the second via in the first direction.

2. The circuit board of claim 1, further comprising a second staircase antenna including a fourth patch antenna formed on the first conductive layer, the second patch antenna formed on the second conductive layer, and a fifth patch antenna formed on the third conductive layer, wherein the second patch antenna is laterally offset from the fourth patch antenna in a second direction substantially perpendicular to the first direction, and the fifth patch antenna is laterally offset from the second patch antenna in the second direction.

3. The circuit board of claim 1, wherein the first patch antenna is wider than the second patch antenna, and the third patch antenna is wider than the second patch antenna.

4. The circuit board of claim 1, further comprising a ground plane on a fourth conductive layer of the plurality of conductive layers, and an RF signal route on a fifth conductive layer of the plurality of conductive layers.

5. The circuit board of claim 4, wherein the first patch antenna is over the RF signal route, the second patch antenna is over the first patch antenna, and the third patch antenna is over the second patch antenna.

6. The circuit board of claim 4, wherein the third patch antenna is over the RF signal route, the second patch antenna is over the third patch antenna, and the first patch antenna is over the second patch antenna.

7. The circuit board of claim 4, wherein the first via passes through an opening in the ground plane to connect the RF signal route to the first patch antenna.

8. The circuit board of claim 4, further comprising a grounded cage of vias surrounding the RF signal route.

9. The circuit board of claim 1, further comprising an array of staircase antennas including the first staircase antenna as one antenna element of the array.

10. The circuit board of claim 1, wherein first staircase antenna radiates at a diagonal relative to a planar surface of the circuit board.

11. A method of antenna formation, the method comprising:

forming a first via in a circuit board, the first via configured to handle a radio frequency (RF) signal;

forming a first staircase antenna in the circuit board, the first staircase antenna including a first patch antenna, a second patch antenna, and a third patch antenna as steps of the first staircase antenna, wherein the first patch antenna is formed on a first conductive layer of the circuit board and is connected to the first via, the second patch antenna is formed on a second conductive layer of the circuit board and is laterally offset from the first patch antenna in a first direction, and the third patch antenna is formed on a third conductive layer of the circuit board and is laterally offset from the second patch antenna in the first direction, the third patch antenna laterally offset from the first patch antenna such that the third patch antenna and the first patch antenna are non-overlapping along the first direction;

forming a second via in the circuit board, the second via connecting the first patch antenna to the second patch antenna and laterally offset from the first via in the first direction; and forming a third via in the circuit board, the third via connecting the second patch antenna to the third patch antenna and laterally offset from the second via in the first direction.

12. The method of claim 11 further comprising forming a second staircase antenna in the circuit board, the second staircase antenna including a fourth patch antenna on the first conductive layer, the second patch antenna on the second conductive layer, and a fifth patch antenna on the third conductive layer, wherein the first staircase antenna radiates with a first antenna polarization, and the second staircase antenna radiates with a second antenna polarization.

13. The method of claim 11, wherein the first patch antenna is wider than the second patch antenna, and the third patch antenna is wider than the second patch antenna.

14. The method of claim 11, further comprising forming a ground plane on a fourth conductive layer of the circuit board, and an RF signal route on a fifth conductive layer of the circuit board.

15. A staircase antenna structure comprising:

a staircase antenna including a first patch antenna, a second patch antenna, and a third patch antenna as steps of the staircase antenna, wherein the first patch antenna is formed on a first conductive layer, the second patch antenna is formed on a second conductive layer and is laterally offset from the first patch antenna in a first direction, and the third patch antenna is formed on a third conductive layer and is laterally offset from the second patch antenna in the first direction, the third patch antenna laterally offset from the first patch antenna such that the third patch antenna and the first patch antenna are non-overlapping along the first direction;

a first via connected to the first patch antenna and configured to carry a radio frequency (RF) signal;

a second via connecting the first patch antenna to the second patch antenna and laterally offset from the first via in the first direction; and a third via connecting the second patch antenna to the third patch antenna and laterally offset from the second via in the first direction.

16. The staircase antenna structure of claim 15, wherein the first patch antenna is wider than the second patch antenna, and the third patch antenna is wider than the second patch antenna.

17. The staircase antenna structure of claim 15, further comprising a ground plane on a fourth conductive layer, and an RF signal route on a fifth conductive layer.

18. The staircase antenna structure of claim 17, wherein the first patch antenna is over the RF signal route, the second patch antenna is over the first patch antenna, and the third patch antenna is over the second patch antenna.

19. The staircase antenna structure of claim 17, wherein the third patch antenna is over the RF signal route, the second patch antenna is over the third patch antenna, and the first patch antenna is over the second patch antenna.

20. The staircase antenna structure of claim 17, wherein the first via passes through an opening in the ground plane to connect the RF signal route to the first patch antenna.

* * * * *